United States Patent [19]
McCord

[11] 4,162,638
[45] Jul. 31, 1979

[54] PRECISION WIRE STRIPPER
[75] Inventor: Daniel McCord, Geneva, Ill.
[73] Assignee: Ideal Industries, Inc., Sycamore, Ill.
[21] Appl. No.: 855,243
[22] Filed: Nov. 28, 1977

Related U.S. Application Data
[63] Continuation of Ser. No. 741,702, Nov. 15, 1976, abandoned.
[51] Int. Cl.² .............................................. H02G 1/12
[52] U.S. Cl. .................................... 81/9.5 R; 30/90.1
[58] Field of Search ............ 30/90.1; 81/9.5 R, 9.5 B

[56] References Cited
U.S. PATENT DOCUMENTS 3,795,023   3/1974   Miragliotta ....................... 30/90.1 X
3,902,206   9/1975   Naquin .......................... 81/9.5 R X FOREIGN PATENT DOCUMENTS
2301383   7/1974   Fed. Rep. of Germany ............ 30/90.1

*Primary Examiner*—James L. Jones, Jr.
*Assistant Examiner*—James. G Smith
*Attorney, Agent, or Firm*—Kinzer, Plyer, Dorn & McEachran

[57] ABSTRACT

This is concerned with a small hand-held precision wire stripper which has two levers pivoted together and offset stripping jaws on one side so that the stripper can reach and strip insulation from wires in highly inaccessible places, such as electrical boxes and the like, with an arrangement for insuring accurate alignment of the stripping notches on the jaws.

5 Claims, 3 Drawing Figures

PRECISION WIRE STRIPPER

This is a continuation of application Ser. No. 741,702, filed Nov. 15, 1976 now abandoned.

SUMMARY OF THE INVENTION

This invention is concerned with a hand-held, highly precision wire stripper which is constructed to sever the insulation around electric wires and pull the insulation from the wires.

A primary object of the invention is a small precise wire stripper which can reach wires inside of boxes which have otherwise been highly inaccessible.

Another object is an inexpensive small wire stripper which nevertheless insures accurate alignment of the insulation cutting notches on its jaws.

Another object is a stripper of the above type with guide surfaces on laterally offset stripping jaws which insure accurate alignment of the insulation cutting notches.

Another object is a wire stripper of the above type which is inexpensive to manufacture and achieves reliability and accuracy previously unattainable in a unit of this type.

Another object is an inexpensive wire stripper which acquires an accuracy in insulation stripping far exceeding anything previously obtained with a stripper of this nature.

Other objects will appear from time to time in the ensuing specification and drawings.

DESCRIPTION OF THE PREFERRED EMBODIMENTS

Figure 1:
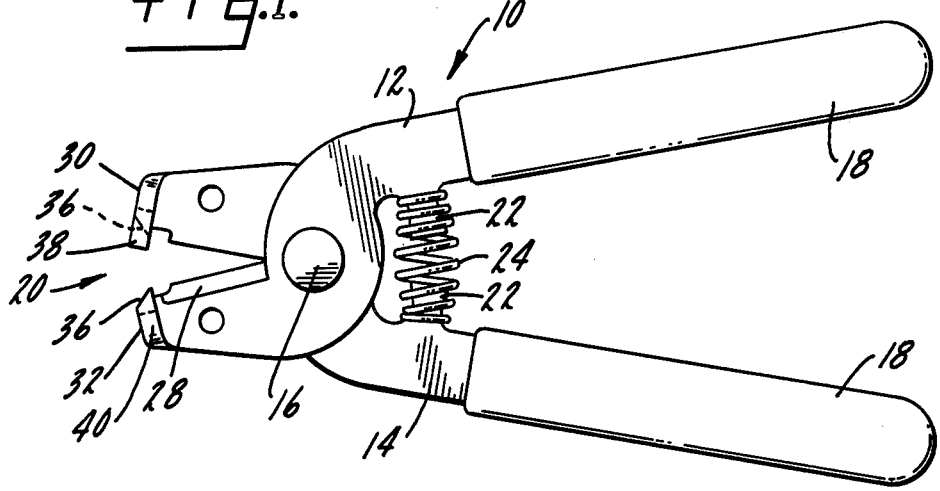
FIG. 1 is a side view of the stripper.

In FIG. 1 a hand-held wire stripper has been indicated generally at 10 with two levers 12 and 14 pivoted together at 16 with handles 18, possibly insulation-covered, on one side and jaws 20 on the other. The inner portions of the handles may have lugs 22 to accept a spring 24 which biases the handles and jaws open, which is conventional.

Figure 2:
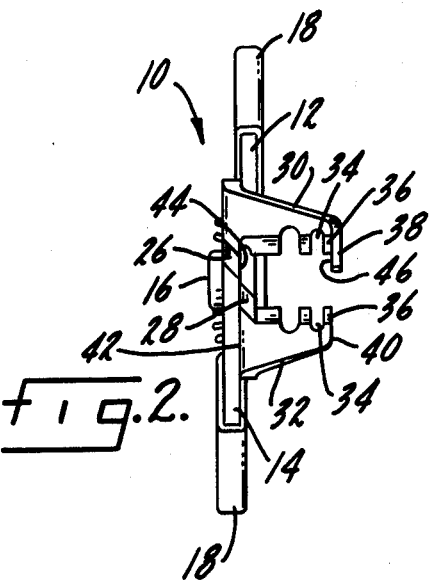
FIG. 2 is an end view of FIG. 1 with the jaws open.
Figure 3:
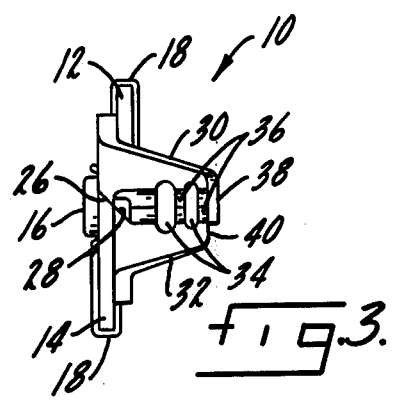
FIG. 3 is like FIG. 2 with the jaws closed.

The portion of the levers between the jaws 20 and the pivot 16 have cutting edges 26 and 28 which slide past each other in a scissors action, shown in FIG. 2. The nose or forward portion of each of the levers is offset or bent at about 90° to one side to provide an upper jaw 30 and a lower jaw 32 with each of the jaws having aligned notches 34, shown in this case as two, which vary in size so that the device will accept a number of wire sizes. The edges of the jaws are beveled or sharpened as at 36 in the same direction so that the two knife edges come together, as shown in FIG. 3, rather than scissoring past each other like the cutting edges 26 and 28. The outer end of one of the offset members, shown in this case as the upper jaw, is provided with a lug or extension 38 which extends below its cutting edge a certain distance and is displaced beyond the outer surface 40 of the other jaw, in this case the lower jaw, so that when the two are fully closed, as shown in FIG. 3, the inner surface of lug or extension 38 of the upper jaw slides past the end surface 40 of the lower jaw. Thus, as shown in FIG. 3, the aligned notches for severing the insulation will be accurately guided together because surfaces 40 and 42 on each side of the lower set of notches are bounded by and slide inside of the surfaces 44 and 46 that bound the upper set of notches.

The use, operation and function of the invention are as follows:

A small hand-held stripper of this nature must be inexpensive, which normally means that it cannot be highly accurate. In prior strippers of this nature where the notches have been on the opposed scissor jaws, they have had very little accuracy to begin with and as the tool was used, what accuracy they had diminished because the pivot 16, which is an inexpensive upset brad or rivet will wear rapidly and the notches for stripping the insulation, which are supposed to be aligned, will become more misaligned.

In the present arrangement, by turning the jaws at 90° and providing both inner and outer bounding or guiding surfaces which fit within each other when the jaws are fully closed, as shown in FIG. 3, this insures that increasing looseness in the pivot 16 due to wear will not affect the accuracy of the notches. It is very important that the center line or axis of the opposed notches remain lined up as much as possible, otherwise when stripping the insulation from a given wire, the wire itself will be knicked which is very detrimental in installations, such as in aircraft work, where vibrations will set up a stress concentration at such a knick which, in due time, will result in a failure. Accuracy is also important where the wires have the more exotic types of insulation which are hard to cut and any misalignment will result in an inadequate or ragged strip.

It will be noted that the arc of movement of the jaws has no effect upon the alignment surfaces 40–46 since they are at 90° to the pivot, and any looseness in the pivot caused by wear which will result in increased misalignment between opposed notches will be in the longitudinal direction of the wire itself and will not result in knicking of the conductor.

While in the arrangement shown the inner guiding surfaces 40 and 42 have been shown on the lower jaw and the outer guiding surfaces 44 and 46 on the upper jaw, it should be understood that they may be reversed. The arrangement shown also has the advantage that the blanks are virtually identical and only one pattern or blank needs to be used with the grinding of the various bevels and cutting surfaces determining thereafter which will be the lower and which will be the upper, with the nose which forms surface 38 being ground or cut off of, in this case, the lower jaw member. Incidentally, the wire bending holes, shown in the jaws in FIG. 1, are conventional and unimportant.

Another advantage of the aligned surfaces is that the outer nose portion on the upper jaw provides a certain safety feature and insures that extraneous items, such as fingers and the like, are moved out of the way prior to closing of the cutters.

While the preferred form and several variations of the invention have been shown, described and suggested, it should be understood that suitable additional modifications, changes, substitutions and alterations may be made without departing from the invention's fundamental theme.

The embodiments of the invention in which an exclusive property or privilege is claimed are defined as follows:

1. In a wire stripper, a pair of longitudinally disposed levers pivoted together about an axis lateral to the longitudinal plane of the levers to perform a scissors action, manually operable handles on the levers on one side of the pivot and opposed stripping jaws on the levers on the other side, the jaws being offset to one side axially of the general longitudinal plane of the levers and having at least one set of opposed insulation cutting notches therein, and paired longitudinally disposed guide surfaces on each of the jaws on each side of the opposed notches to assure alignment of the opposed notches upon closing of the jaws, the guide surfaces on one jaw laterally bounding the guide surfaces on the other jaw.

2. The structure of claim 1 further characterized in that the jaws are offset at approximately 90° to the general longitudinal plane of the levers.

3. The structure of claim 1 further characterized in that the jaws are formed as offset portions bent at 90° to the general longitudinal plane of the levers.

4. The structure of claim 1 further characterized by and including a series of opposed insulation cutting notches that vary in size so as to accept a number of wire sizes.

5. The structure of claim 1 further characterized by and including scissors-type cutting edges between the jaws and the pivot.

* * * * *